United States Patent
Zhang et al.

(10) Patent No.: US 12,085,487 B2
(45) Date of Patent: Sep. 10, 2024

(54) AUTOMATIC SAMPLING DEVICE

(71) Applicant: NORTHWEST INSTITUTE OF ECO-ENVIRONMENT AND RESOURCES, CAS, Lanzhou (CN)

(72) Inventors: Caixia Zhang, Lanzhou (CN); Ningjing Tan, Lanzhou (CN); Zhishan An, Lanzhou (CN)

(73) Assignee: NORTHWEST INSTITUTE OF ECO-ENVIRONMENT AND RESOURCES, CAS, Lanzhou (CN)

( * ) Notice: Subject to any disclaimer, the term of this patent is extended or adjusted under 35 U.S.C. 154(b) by 0 days.

(21) Appl. No.: 18/630,719

(22) Filed: Apr. 9, 2024

(65) Prior Publication Data
US 2024/0255389 A1 Aug. 1, 2024

(30) Foreign Application Priority Data
Apr. 13, 2023 (CN) .......................... 202310391601.9

(51) Int. Cl.
G01N 1/08 (2006.01)
B62D 55/065 (2006.01)
G01N 1/20 (2006.01)

(52) U.S. Cl.
CPC ............. G01N 1/08 (2013.01); B62D 55/065 (2013.01); G01N 1/20 (2013.01); G01N 2001/2028 (2013.01)

(58) Field of Classification Search
CPC .... G01N 1/20; G01N 1/08; G01N 2001/2028; B62D 55/065
USPC ......................................... 73/864.44–864.45
See application file for complete search history.

(56) References Cited

U.S. PATENT DOCUMENTS
2014/0031977 A1  1/2014 Goldenberg

FOREIGN PATENT DOCUMENTS

| CA | 2831006 A1 | * | 1/2014 | ............ B25J 11/002 |
| CN | 110683171 A | | 1/2020 | |
| CN | 111337293 A | | 6/2020 | |
| CN | 111474007 A | | 7/2020 | |
| CN | 111665086 A | | 9/2020 | |
| CN | 111829818 A | | 10/2020 | |
| CN | 113203432 A | * | 8/2021 | |
| CN | 110926850 B | * | 12/2021 | ............... G01N 1/04 |

(Continued)

OTHER PUBLICATIONS

Xinsheng Xu et al., "Design of the Drawer Type Slope Runoff Sampler", Fujian Nongji, Sep. 30, 2015, No. 3, pp. 30-34.

(Continued)

*Primary Examiner* — Daniel S Larkin
*Assistant Examiner* — Nashmiya S Fayyaz

(57) ABSTRACT

An automatic sampling device includes a sampling unit, a traveling unit and a power supply unit. The sampling unit includes a push module, which includes a push mechanism and a turning mechanism. A plurality of collection modules are sequentially disposed and can be constrained between the turning mechanism and the push mechanism. The push mechanism is at least configured to push the plurality of collection modules to abut against the turning mechanism. The turning mechanism is at least configured to turn over a designated collection module to a material receiving position, and to enable the receiving port of the designated collection module facing towards a sample outlet of the sampling module.

12 Claims, 16 Drawing Sheets

(56) References Cited

FOREIGN PATENT DOCUMENTS

CN          220207213 U  * 12/2023
WO     WO-2004083531 A2 *  9/2004   ............... E02D 1/04

OTHER PUBLICATIONS

Bo Sun et al., "The Design of an Automatic Recording and Sampling System for Leakage Soil Moisture", Journal of Southwest University(Natural Science Edition), Mar. 20, 2013, vol. 35, No. 3, pp. 152-155.

* cited by examiner

AUTOMATIC SAMPLING DEVICE

CROSS-REFERENCE TO RELATED APPLICATIONS

This application claims the benefit of priority from Chinese Patent Application No. 202310391601.9, filed on Apr. 13, 2023. The content of the aforementioned application, including any intervening amendments thereto, is incorporated herein by reference in its entirety.

TECHNICAL FIELD

This application relates to sampling devices, and more specifically to an automatic sampling device.

BACKGROUND

In deserts, the dune morphology is dominated by pyramidal dunes, and the sampling analysis on different regions on their surfaces is necessary for obtaining the characteristics of desert evolution. Generally, different sampling regions of the dune are selected and sampled one by one. However, some pyramidal dunes have a sand hill-like structure with a relatively large height, and it is required to climb and shuttle between the ridge line and various surfaces of the dune, which reduces the sampling efficiency and increases the unnecessary labor consumption. In addition, as the sand is fine and soft, the dunes are prone to collapse when the researchers tread thereon, which may cause the to-be-sampled area to collapse, be destroyed or buried, increasing the sampling difficulty and threatening the researcher's safety.

SUMMARY

An objective of the present disclosure is to provide an automatic sampling device to overcome the deficiencies in the prior art.

Technical solutions of the present disclosure are described below.

This application provides an automatic sampling device, comprising:
  a sampling unit;
  a traveling unit; and
  a power supply unit;
  wherein the sampling unit comprises a sampling module, a collection module, a push module and a discharge module; the sampling module is configured to be in contact with and collect a material sample; the collection module comprises a plurality of containers and a plurality of covers; a receiving port of the designated container at a material receiving position faces toward a sample inlet; the collection module comprises a sealing mechanism; the sealing mechanism is in contact with the cover of the designated container and to put the cover on the receiving port of the designated container for sealing the receiving port; the plurality of containers and covers thereof are sequentially provided on a motion path of the push module; the push module is at least configured to push the designated container and the cover thereof to the material receiving position, so that the receiving port of the designated container corresponds to the sample outlet of the sampling module and receives the material sample collected by the sampling module; and the discharge module is configured to place the designated container at a designated discharge position;
  the traveling unit is connected to the sampling unit, and is configured to move the sampling unit to a specified sampling area;
  the power supply unit is connected to the sampling unit and the traveling unit, and is at least configured to provide power to the sampling unit and the traveling unit; and
  the push module comprises a push mechanism and a turning mechanism; the plurality of containers and the plurality of covers are configured to be constrained between the turning mechanism and the push mechanism; the push mechanism is configured to push the plurality of containers and the plurality of covers to abut against the turning mechanism; and the turning mechanism is configured to turn the plurality of containers and the plurality of covers to the material receiving position in sequence and to enable a receiving port of each of the plurality of containers to face towards the sample outlet of the sampling module.

In an embodiment, the sampling module comprises a sampling member which is movable; and the sampling member is configured to be driven by a first drive mechanism to move between a first working position and a second working position; a sample inlet of the sampling member is configured to be in contact with and collect the material sample when the sampling member is in the first working position, and a sample outlet of the sampling member is configured to discharge the material sample when the sampling member is in the second working position.

In an embodiment, the collection module further comprises a connecting member provided between adjacent two containers; or
  the collection module further comprises a plurality of connecting members, and the plurality of connecting members and the plurality of containers are alternately arranged.

In an embodiment, the turning mechanism comprises a stop plate, and the stop plate is provided with a receiving groove; the stop plate is configured to move between a receiving position and a turning position; the receiving groove is configured to be at least partially in contact with the designated container when the stop plate is at the receiving position; and when the stop plate is at the turning position, the receiving groove is configured to allow the designated container therein to slide to the material receiving position, and a next designated container is configured to abut against the stop plate.

In an embodiment, the stop plate is provided with a bevel towards a sliding direction of the designated container.

In an embodiment, the bevel is flat or curved.

In an embodiment, the turning mechanism further comprises a ball; the ball is configured to roll or slide on a surface where the bevel is located; and when the stop plate is at the turning position, the ball is configured to be at least partially in contact with the designated container.

In an embodiment, the traveling unit comprises a wheel set and a traveling belt, and the traveling belt is in transmission connection with the wheel set; and the wheel set is configured to be driven by a second drive mechanism to rotate to allow generation of an interaction force between the traveling belt and the ground to move the automatic sampling device.

In an embodiment, the wheel set comprises at least one active wheel and a plurality of driven wheels; the at least one active wheel and the plurality of driven wheels are all in transmission connection with the travelling belt; the at least one active wheel is in transmission connection with the second drive mechanism via a transmission shaft; and a rotation axis of the at least one active wheel is collinear with an axis of the transmission shaft or forms an angle with the axis of the transmission shaft.

In an embodiment, a section of the traveling belt along a direction parallel to a traveling direction of the traveling belt has a regular shape or an irregular shape; and the regular shape is rectangle, parallelogram, trapezoid, ellipse or circle.

In an embodiment, the power supply unit comprises a first battery; and the first battery is connected to the sampling unit and the traveling unit.

In an embodiment, the power supply unit comprises a battery and a power generation assembly; and the power generation assembly is connected to the battery, and is at least configured to supply electricity to the battery.

In an embodiment, the power supply unit comprises a second battery and a power generation assembly; and the power generation assembly is connected to the second battery, and is at least configured to supply electricity to the second battery.

In an embodiment, the automatic sampling device further comprises a record carrier and a positioning system; wherein the record carrier is configured to capture images of a to-be-detected area in a traveling path of the automatic sampling device; the positioning system is configured to record the traveling path of the automatic sampling device; and the positioning system is connected to the record carrier, and is configured to generate a model of the to-be-detected area by using a measuring system.

Compared with the prior art, the present disclosure has the following advantages.

The traveling unit of the automatic sampling device provided by the present disclosure can provide a traveling direction and a traveling path for the sampling unit, facilitating the automatic sampling device to reach a designated sampling area. At the same time, the sampling module, the collection module and the discharge module in the sampling unit can work cooperatively and sequentially complete the procedures of sampling, loading and discharging. Compared with the manual sampling and forward motion with loads in the prior art, the automatic sampling device provided herein can reduce the workload of the staff and the consumption of physical strength, and can save more time.

Figure 1:
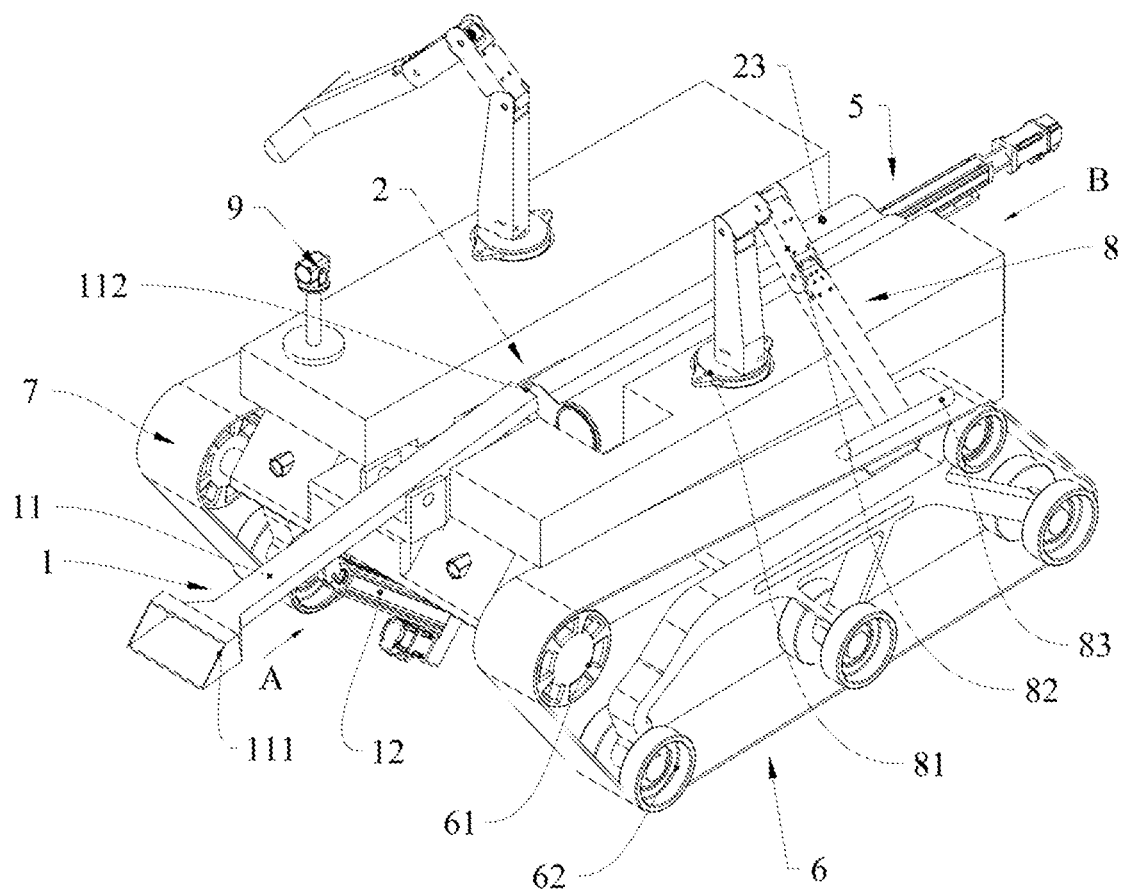
FIG. 1 is a schematic diagram of an automatic sampling device according to an embodiment of the present disclosure.

1, sampling module; 11, sampling member; 111, sample inlet; 112, sample outlet; 113, feeding channel; 114, sand outlet; 115, deflector; 116, slope; 117, cleaning mechanism; 12, first motor; 2, collection module; 221, container; 222, cover; 23, storage cylinder; 3, discharge module; 31, bearing plate; 311, chute; 32, moving block; 33, push plate; 34, discharge port; 4, solar power generation module; 41, mounting base; 42, bracket; 43, solar cell; 5, push module; 51, push mechanism; 52, turning mechanism; 521, receiving groove; 522, stop plate; 523, bevel; 524, ball; 6, wheel set; 61, active wheel; 62, driven wheel; 7, traveling belt; 8, support assembly; 81, support base; 82, connecting arm; 83, support head; 9, record carrier; 10, sand hill; 101, starting point; 102, sampling point; and 103, end point.

DETAILED DESCRIPTION OF EMBODIMENTS

The technical solutions, and implementation processes and principles thereof will be further explained and illustrated as follows with reference to the embodiments.

Embodiment 1

Referring to FIGS. 1-7, provided in this embodiment is an automatic sampling device, which includes a sampling unit, a traveling unit and a power supply unit. When the automatic sampling device is operating, the power supply unit is connected to the sampling unit and the traveling unit, and is at least configured to provide working power to the sampling unit and the traveling unit. The traveling unit is connected to the sampling unit, and is at least configured to move the sampling unit to a specified sampling area. Specifically, the sampling unit includes a sampling module 1, a plurality of collection modules 2, a push module 5 and a discharge module 3. The plurality of collection modules 2 are sequentially provided in a push path of the push module 5. The push module 5 includes a push mechanism 51 and a turning mechanism 52. The plurality of collection modules 2 are constrained between the turning mechanism 52 and the push mechanism 51. The push mechanism 51 is at least configured to push the plurality of collection modules 2 to abut against the turning mechanism 52. The turning mechanism 52 is at least configured to turn over a specified collection module 2 of the plurality of collection modules 2 to a material receiving position. It can be understood that the material receiving position refers to the position of the collection module 2 illustrated in FIGS. 1 and 3, at which the receiving port of the collection module 2 can be set toward a sample outlet 112 of the sampling module 1 and wait to receive the material sample collected by the sampling module 1. The discharge module 3 is configured to place the collection module 2 containing the material sample at a designated discharging position.

When the traveling unit travels to a sampling area, the sampling module 1 collects the material sample, and the collected material sample is discharged from the sample outlet 112 of the sampling module 1 to the receiving port of the collection module 2. After completing the material sample receiving, the collection module 2 is placed in the designated discharging position by the discharge module 3, and then the traveling unit can continue to move or travel to the next sampling area. The turning mechanism 52 can turn over the next designated collection module 2 to the material receiving position for waiting to receive the material sample. The above operations are repeated, and the procedure of sampling-loading-discharging can be carried out. It can be understood as follows. The traveling unit travels to a first sampling region for sampling, and the collection module 2 loaded with material samples sampled from the first sampling region is placed in a first designated discharge position. After that, the traveling unit travels to a second sampling region for sampling, and the collection module 2 loaded with material samples sampled from the second sampling region is placed at a second designated discharge position. The above steps are repeated such that the sampling of multiple sampling regions can be completed. The sampled material samples may be sand, soil, stone, or a combination thereof.

Figure 7:
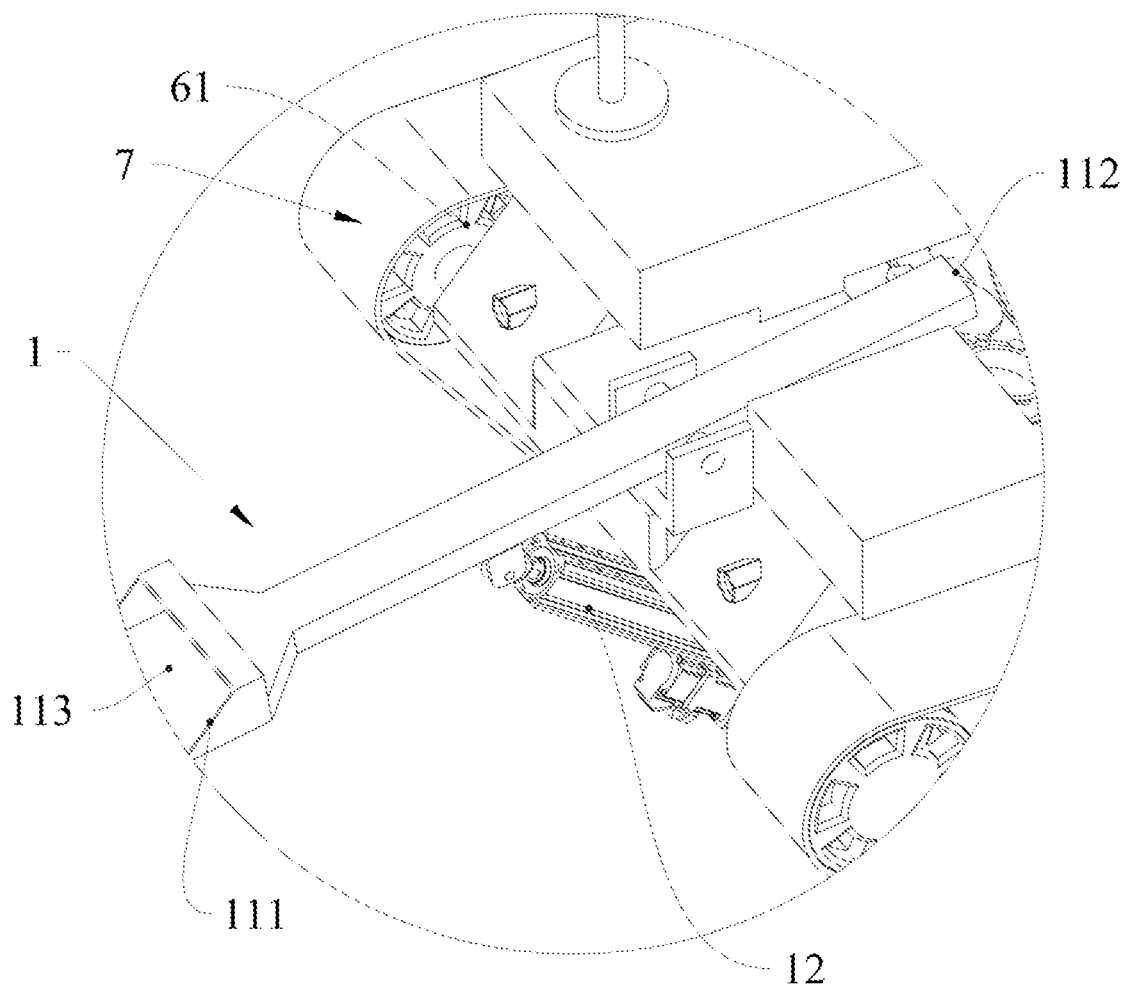
FIG. 7 is a schematic diagram from A direction in FIG. 1.

In an embodiment, the sampling module 1 includes a sampling member 11 that is provided movably. The sampling member 11 is provided with a feeding channel 113. The feeding channel 113 is communicated with a sample inlet 111 and a sample outlet 112 of the sampling member 11. Specifically, the sampling member 11 may be provided with a through-hole or a groove, and the feeding channel 113 is formed inside the through-hole or the groove. One end of the through-hole or the groove is connected to the sample inlet 111, and the other end of the through-hole or the groove is connected to the sample outlet 112. Referring to FIG. 7, the feeding channel 113 provided in this embodiment is a through-hole. One end of the through-hole is connected to the sample inlet 111, and the other end of the through-hole is connected to the sample outlet 112. In this case, when the sampling member 11 is at a first working position, the sample inlet 111 of the sampling member 11 can be in contact with the material sample. When the traveling direction of the traveling unit is the same as the facing direction of the sample inlet 111, the material sample flows or slides to the feeding channel 113 or is received by the feeding channel 113. The sampling member 11 is driven by a first drive mechanism to switch from the first working position to a second working position, and the material sample moves from the feeding channel 113 to the sample outlet 112 and is finally discharged through the sample outlet 112.

Figure 8:
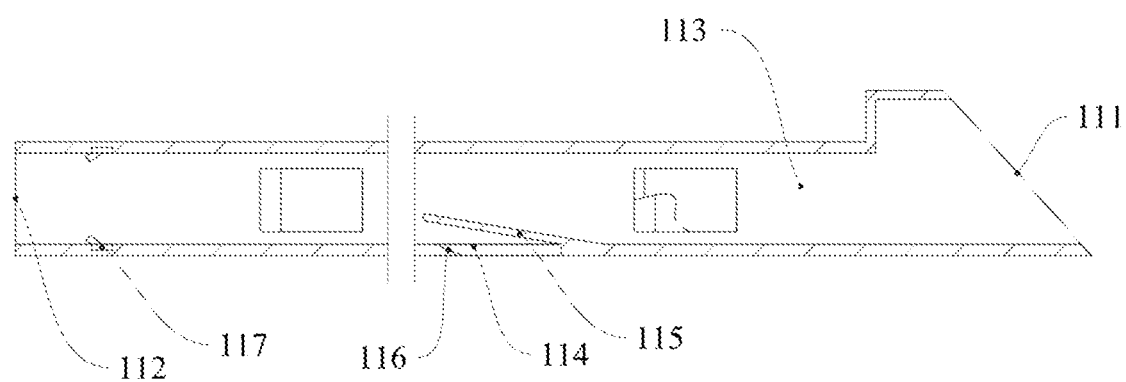
FIG. 8 is a cross-sectional view of a sampling member of the automatic sampling device according to an embodiment of the present disclosure.

Specifically, the sampling member 11 includes a rod and a spade interconnected with each other. The sample inlet 111 is provided on the spade, and the sample outlet 112 is provided on the rod. The feeding channel 113 is a hollow structure connecting the sample inlet 111 and the sample outlet 112. A longitudinal side profile of the spade may be a regular shape or an irregular shape, and the regular shape can be a rectangle, a parallelogram, a trapezoid or a triangle. Preferably, as shown in FIG. 8, the longitudinal side profile of the spade is a trapezoid, and the trapezoid has a top edge and a bottom edge opposite to each other, and a first leg and a second leg opposite to each other. The first leg of the trapezoid forms an acute angle with the bottom edge of the trapezoid, so that when contacting the material sample through the sample inlet 111, the sharp end of the spade can reduce the contact area between the spade and the sand, which facilitates the spade to be extended into or inserted into the sampling area for sampling quickly.

In an embodiment, referring to FIG. 1, the first drive mechanism can be a first motor 12. The automatic sampling device can also include a housing, and the traveling unit, the sampling unit and the power supply unit can be provided on or in the housing. The housing can play a protective role to avoid damage to the components and also facilitate the installation or connection of other units, assemblies, mechanisms and components. The sampling member 11 can be movably connected to the housing via a pin. The driving end of the first motor 12 is connected to the sampling member 11, and the extension and retraction of the driving end of the first motor 12 can drive the sampling member 11 to switch between a first working position and a second working position. Specifically, when the driving end of the first motor 12 is retracted, the sampling member 11 is in the first working position, part of the material sample enters the sampling member 11 through the sample inlet 111 with the forward motion of the sampling device (referring to FIG. 1, the direction in which the sampling member 11 is located is defined as the forward direction, and the movement in that direction is defined as traveling or moving forward). When the driving end of the first motor 12 is extended, the sampling member 11 switches from the first working position to the second working position, and the material sample moves from the sample inlet 111 towards the sample outlet 112 via the feeding channel 113, rendering the material sample to fall or slide or to be transported to the collection module 2.

More specifically, referring to FIG. 8, the rod is provided with a sand outlet 114 and a deflector 115. The sand outlet 114 can be provided on a side wall of the rod, and is sequentially provided with a first end and a second end along a sampling direction. The sampling direction refers to the direction from the sample inlet 111 to the sample outlet 112. At least a portion of the deflector 115 is connected to the first end. When the sampling member 11 is switched from the second working position to the first working position, the residual material sample slides from the sample outlet 112 to the sample inlet 111, and can be discharged from the sampling member 11 through the sand outlet 114 when flowing through the sand outlet 114, so that the residual material sample in the sampling member 11 can be discharged quickly, avoiding the confusion of material samples at different sampling points during sampling.

More specifically, the second end of the sand outlet 114 is also provided with a slope 116, and the slope forms at an obtuse angle with an inner wall of the rod. In this case, when the sampling member 11 is switched from the second working position to the first working position, the residual material sample can pass through the slope 116, and be quickly rolled or slid down and discharged from the feeding channel 113 of the od.

Further, an inner wall of the rod is connected to an inner wall of the spade through a smooth surface, enabling the material sample to slide quickly between the sample inlet 111 and the sample outlet 112 through the smooth surface, thereby enabling the material sample to quickly enter the collection module 2 or be discharged from the sampling member 11.

In this embodiment, the automatic sampling device can provide a traveling direction and a traveling path for the sampling unit through the traveling unit, so that the automatic sampling device can reach a designated sampling area. At the same time, the sampling module 1, the collection module 2 and the discharge module 3 in the sampling unit can work cooperatively and sequentially complete the procedures of sampling, loading and discharging. Compared with the manual sampling and forward motion with loads in the prior art, the automatic sampling device provided herein can complete the collection and loading of the material sample, and the collection module 2 loaded with material samples can be put at a designated discharge position through the discharge module 3, and subsequently the staff can arrive at the designated discharge position to collect samples manually or using a transportation machine, which can reduce the workload and physical exertion of staff and save time.

Embodiment 2

Figure 5:
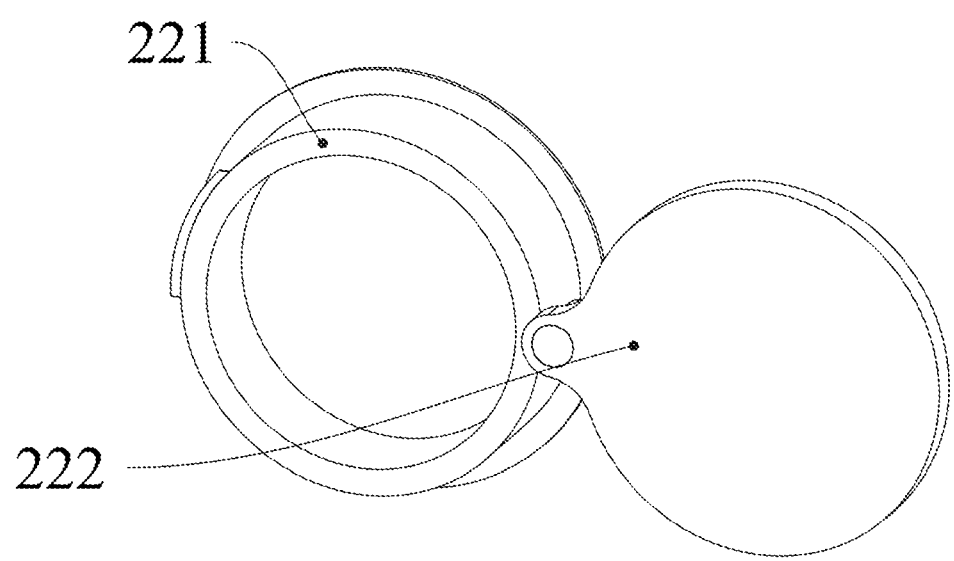
FIG. 5 schematically shows connection between a container and a cover according to an embodiment of the present disclosure.
Figure 6:
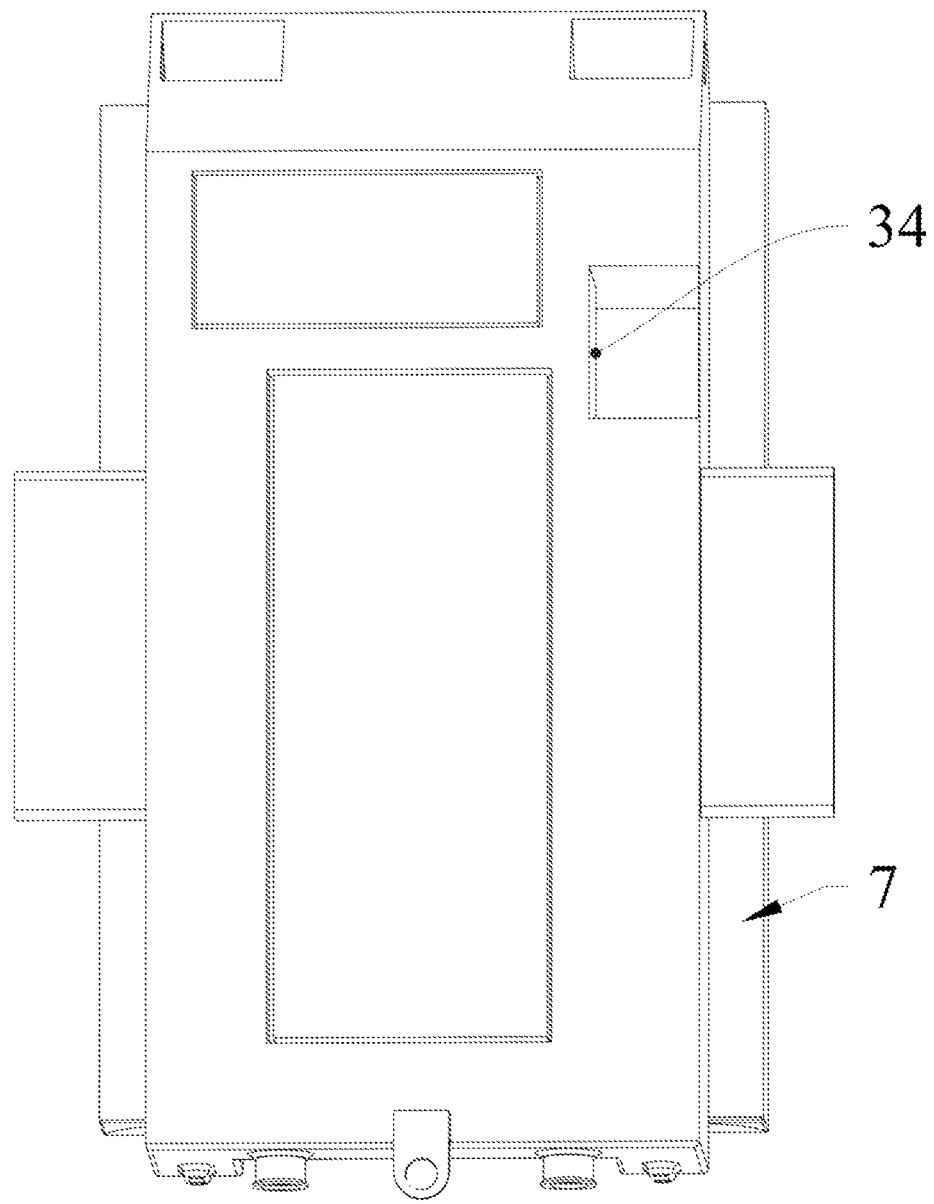
FIG. 6 is a bottom view of the automatic sampling device according to an embodiment of the present disclosure.

Referring to FIG. 5, an automatic sampling device is provided in this embodiment, the structure of which is basically similar to that of Embodiment 1, and the differences are as follows. The collection module 2 includes a container 221 and a cover 222. The container 221 is provided with a receiving port for receiving material samples. The cover 222 can be driven by a sealing mechanism to cover the receiving port so as to keep the container 221 in a closed state, where the container 221 and the cover 222 are in an integrated or split structure. When a push distance of the second motor is one unit, it pushes the cover 222 and the container 221 simultaneously for a distance of one unit. The cover 222 may be movably connected to the container 221 by a flexible member or a rigid member. More specifically, the rigid member may be a pivot, and the cover 222 may be rotationally connected to the container 221 via the pivot. The center of rotation of the cover 222 may be the center of the container 221 or may be offset from the center of the container 221. FIG. 5 shows a form of movable connection of the cover 222 with the container 221. After the container 221 is loaded with the material sample, the sealing mechanism drives the cover 222 to rotate or move to cover the receiving port, so that the cover 222 is sealedly connected to the receiving port, and the material sample can be sealed in the space enclosed by the container 221 and the cover 222.

In an embodiment, a plurality of containers 221 may be sequentially connected by a connecting member. The plurality of containers 221 may be stacked or arranged in a specified order and direction to form a group of containers 221. Specifically, a plurality of containers 221 in a group of containers 221 are provided with receiving ports facing the material receiving position and are stacked in sequence to form a group of containers 221. Preferably, the connecting member is a flexible member, and the flexible member may be a wire or a rope. Taking a rope as an example, the rope connects a designated container 221 with a second container 221, when the designated container 221 of the group of containers 221 is loaded with material sample and discharged to a discharge position of a first sampling location, the automatic sampling device moves to a second sampling location, loads material sample to the second container 221 and discharges the second container 221 to the second sampling location. One end of the rope is connected to the designated container 221, and the other end of the rope is connected to the second container 221. The above operations are repeated, so that when the sampling is finished, a plurality of containers 221 connected by a plurality of connecting members are obtained at the sampling location. In this case, the staff can take out all the connecting members by picking up one connecting member, instead of picking up one by one. This enables rapid collection of the containers 221, saving time and reducing workload.

Figure 4:
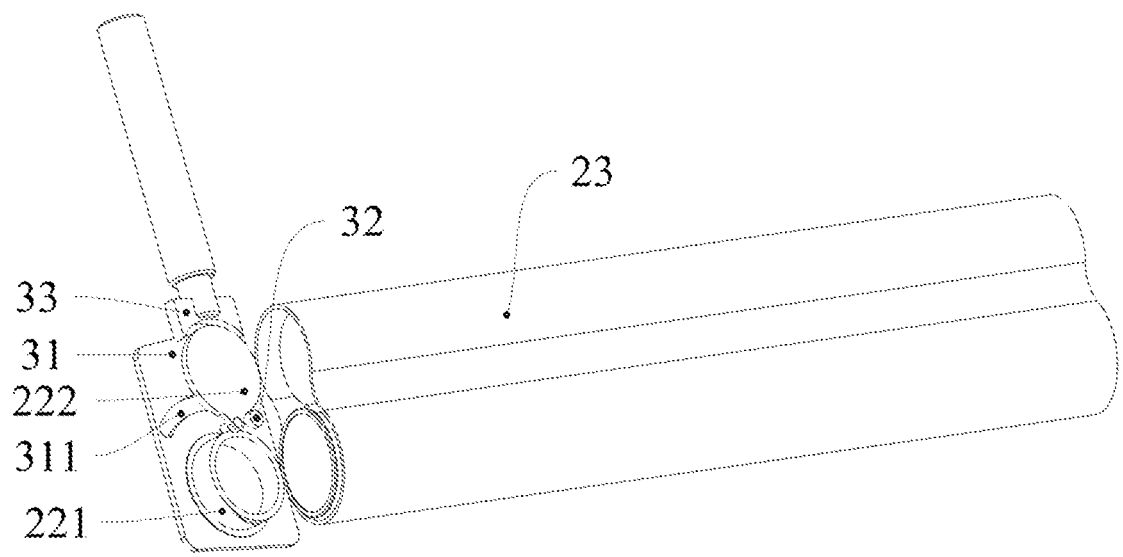
FIG. 4 is an enlarged view of a collection module and a discharge module of the automatic sampling device according to an embodiment of the present disclosure.
Figure 9:
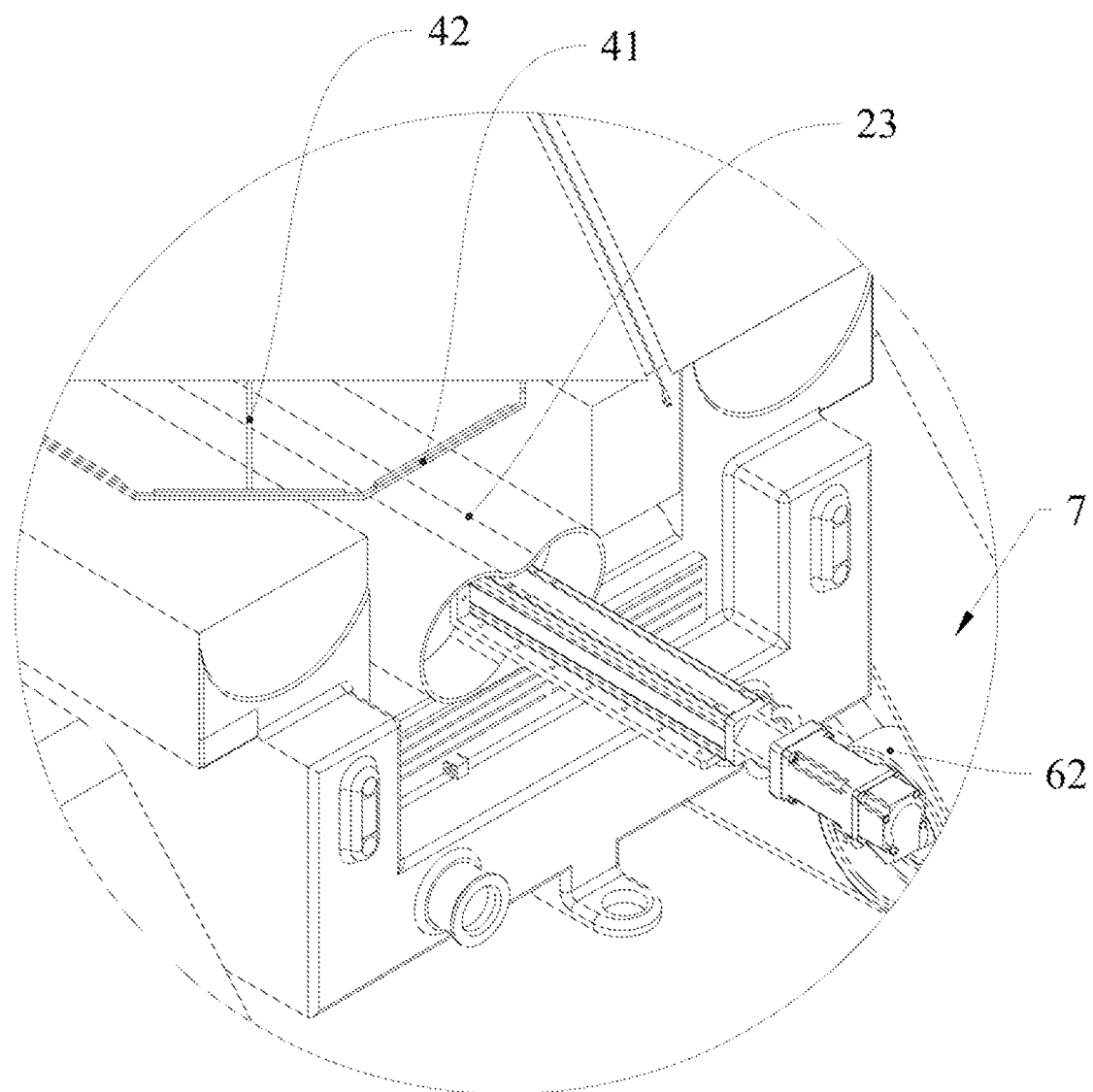
FIG. 9 is a schematic diagram from B direction in FIG. 1.

Further, referring to FIGS. 4 and 9, the collection module 2 further includes a storage cylinder 23 for storing and loading a group of containers 221. The storage cylinder 23 is provided with a storage chamber throughout the storage cylinder 23, and the group of containers 221 can be placed in the storage chamber. The container 221 at the tail end of the group of containers 221 is the one close to the push mechanism 51, and can abut against the push mechanism 51. When the push mechanism 51 pushes the group of containers towards the material receiving position, the container 221 at the head end of the group of containers 221 (i.e., the one close to the material receiving position) is pushed out from the other end of the storage chamber. The storage cylinder 23 is capable of constraining the containers 221 and enabling them to move along a specified push path.

Figure 10:
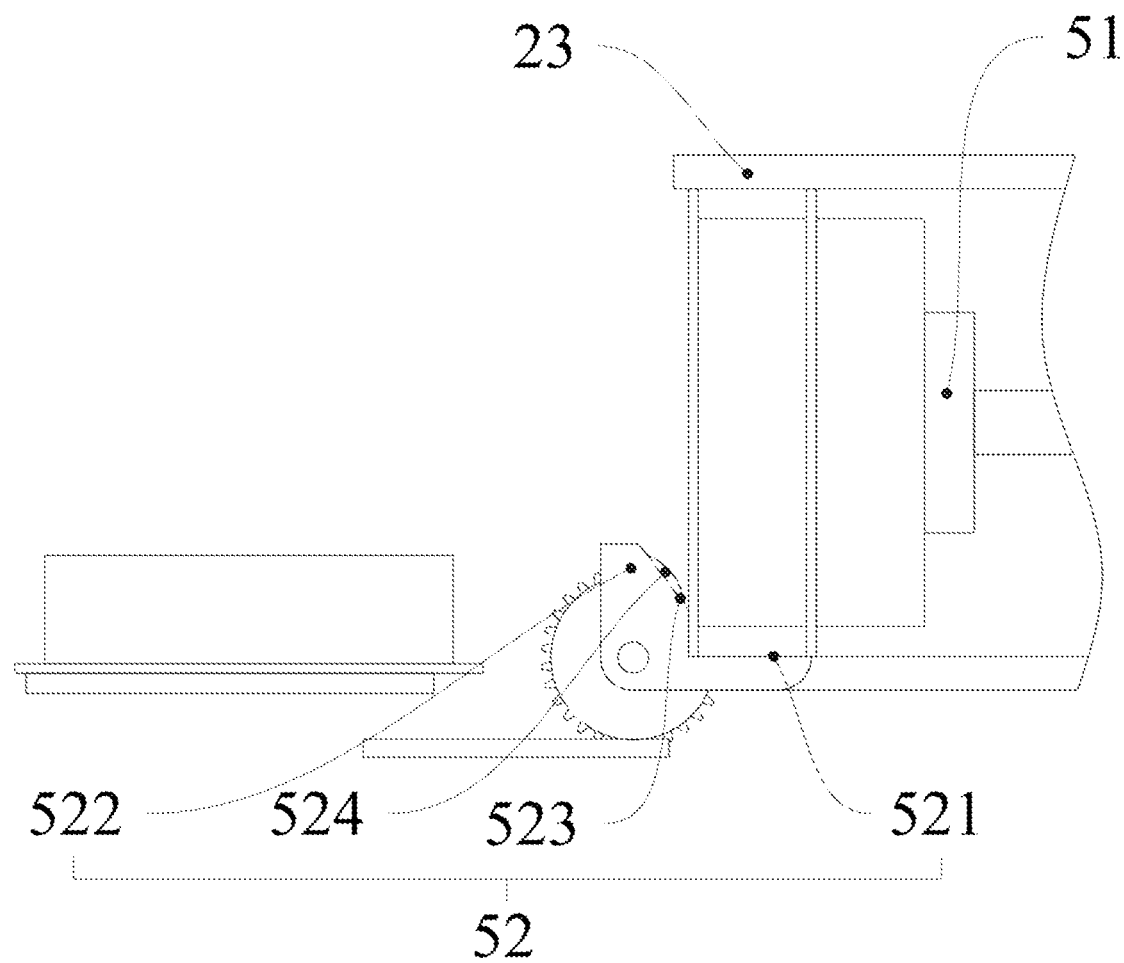
FIG. 10 schematically shows an operation of a push mechanism according to an embodiment of the present disclosure.
Figure 11:
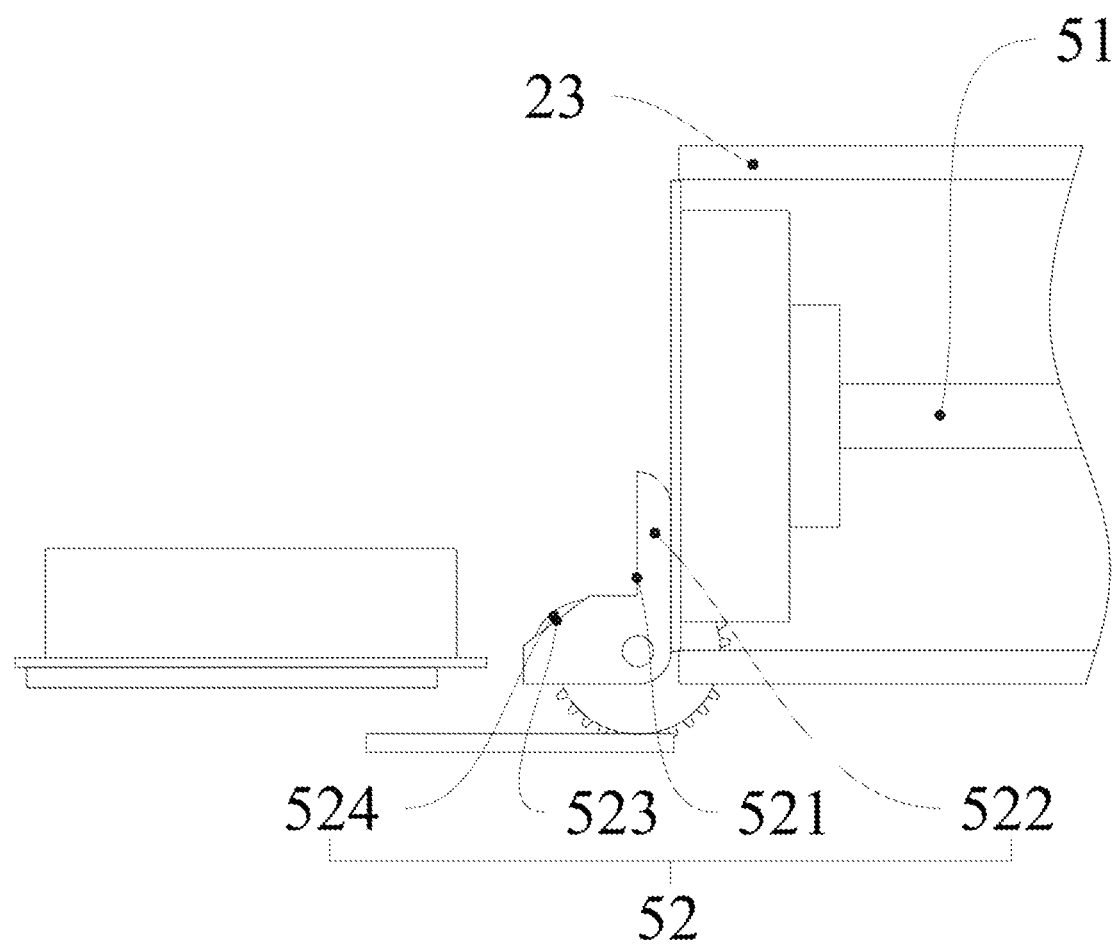
FIG. 11 schematically shows another operation of the push mechanism according to an embodiment of the present disclosure.

Specifically, referring to FIGS. 10 and 11, the turning mechanism 52 includes a stop plate 522, and the stop plate 522 is provided with a receiving groove 521. The stop plate 522 is capable of moving between a receiving position and a turning position. As shown in FIG. 10, when the stop plate 522 is in the receiving position, a plurality of the containers 221 are sequentially stacked or provided in a head-to-head manner, and are constrained between the receiving groove 521 of the turning mechanism 52 and the push mechanism 51. When the stop plate is in the turning position, the plurality of containers 221 are restrained against an outer wall of the stop plate 522, and the receiving groove 521 is provided towards the material receiving position.

When the previous container 221 completes the material sample receiving and is placed in the designated discharge position, the stop plate 522 moves from the receiving position to the turning position and turn the container 221 in the receiving groove 521. When the stop plate 522 is turned to the designated overturning position, the receiving port of the container 221 at the material receiving position is set in correspondence with the sample outlet 112, and waits for the material sample to be discharged from the sample outlet 112. As shown in FIG. 11, the plurality of containers 221 are pushed by the push mechanism 51 to abut against a side of the stop plate 522. The push mechanism 51 may include an elastic member, and the elastic member may be a spring or a torsion spring. The elastic member can push against the container 221 along the direction from the right to the left as illustrated in FIG. 11. When a designated container 221 completes the material sample collection, the discharge module 3 places it in a designated discharge position, and the stop plate 522 continues to rotate towards the receiving position. During the rotation of the stop plate 522, an edge of the stop plate 522 is pressed against the next container 221 to enable the next container 221 to move towards the side close to the elastic member, and the elastic member is continuously compressed. In this case, the next container 221 can always be restrained between the elastic member and the stop plate 522. When the stop plate 522 is rotated back to the receiving position, the next container 221 is pushed into the receiving groove 521 by the pushing mechanism 51 to form the state shown in FIG. 10 again, and so on, so that the stop plate 522 can continuously put the designated container 221 in the material receiving position.

In a specific embodiment, the receiving groove 521 is further provided with a bevel 523. The bevel 523 may be provided towards a sliding direction of the container 221 to facilitate the container 221 sliding to the material receiving position. More specifically, the bevel 523 may also be provided with a ball 524, and the ball 524 is configured to roll or slide on the bevel. In this case, when the container 221 slides from the bevel 523, it is in contact with the ball 524, facilitating the rapid sliding of the container to the material receiving position.

More specifically, the storage cylinder 23 may also be movably provided with a push plate. A group of containers 221 has a head end and a tail end. The head end is provided on the side close to the stop plate 522, and the push plate may abut against the container 221 at the tail end of the group of containers 221. Referring to FIGS. 10 and 11, and taking the specific orientation of the components in the drawings as an example, the group of containers 221 may be continuously pushed from right to left, and the push plate can be provided on the right side of the group of containers 221. The push mechanism 51 can move the group of containers 221 by pushing the push plate, and the push plate can withstand the pushing force from the push mechanism 51, leading to a more uniform force on the push plate. Such a uniform force can push the container 221 to move.

Figure 2:
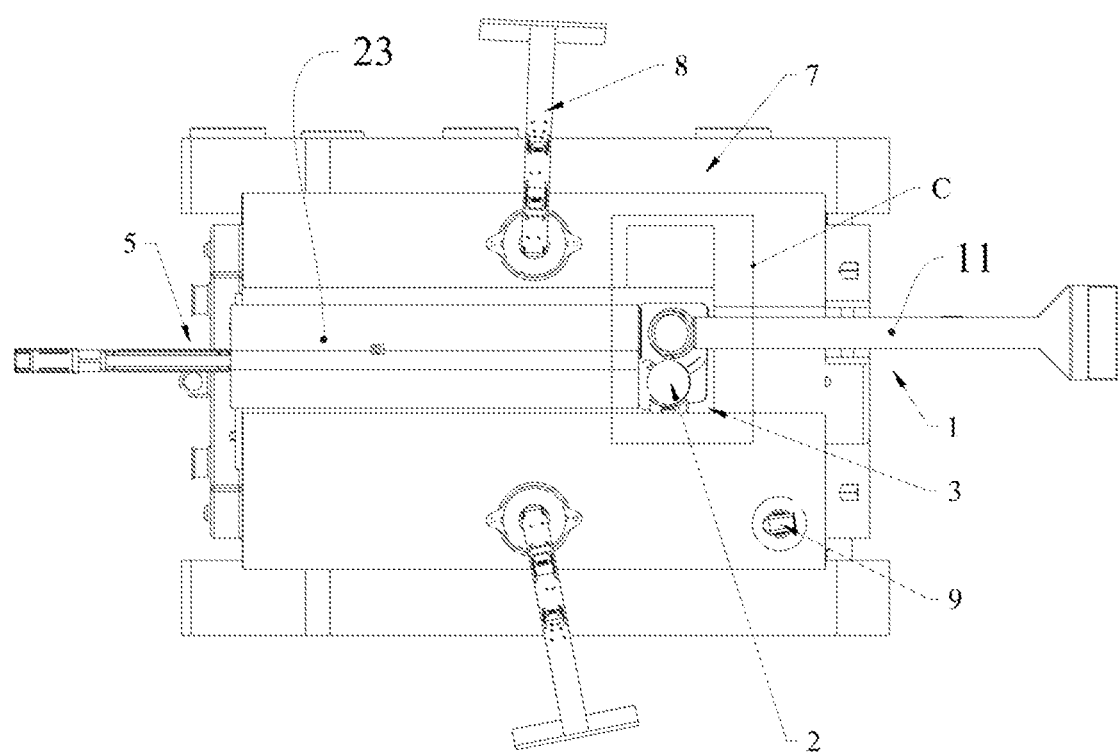
FIG. 2 is a top view of the automatic sampling device according to an embodiment of the present disclosure.
Figure 3:
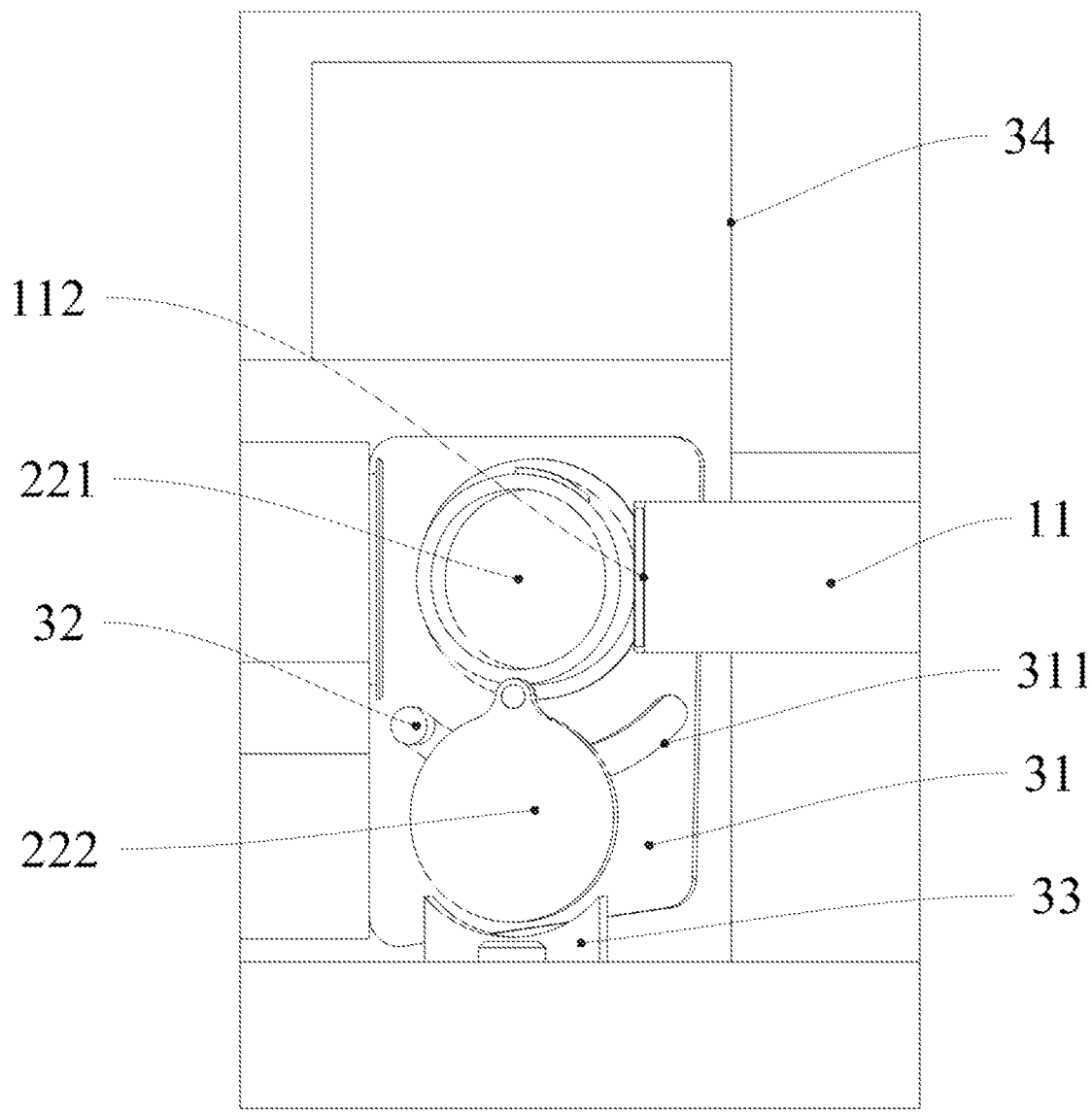
FIG. 3 is an enlarged view of portion C in FIG. 2.

In an embodiment, the discharge module 3 may be a robotic arm, or in this embodiment, the discharge module 3 includes a bearing plate 31, a push plate 33 and a discharge port 34. Referring to FIGS. 2-4, the material receiving position is provided on the bearing plate 31. Referring to FIG. 3, a designated container 221 is placed at the material receiving position of the bearing plate 31. After the container 221 completes the material sample collection, the push plate 33 moves towards the side close to the discharge port 34 such that the container 221 is discharged or dropped from the discharge port 34.

More specifically, the sealing mechanism includes a moving block 32. The moving block 32 is movably connected to the bearing plate 31. The designated container 221 and the cover 222 rotationally connected thereto are placed at the material receiving position of the bearing plate 31. After the container 221 completes the loading of the material sample, the moving block 32 can be driven by an external force to allow the cover 222 to rotate to close over the container 221. In this embodiment, the top and the bottom of the automatic sampling device are communicated through the discharge port 34, so that the container 221 can be dropped on the ground (i.e., on a sand body) below the automatic sampling device through the discharge port 34. The container 221 can be quickly thrown through the discharge module 3 after completing the loading of material samples.

Further, referring to FIG. 3, the bearing plate 31 is further provided with a chute 311 for guiding the movement of the moving block 32. The guiding track of the chute 311 may be regularly linear or irregularly linear, and the regular linearity may be a straight line or an arc.

More specifically, a first linkage arm (not shown in the drawings) is also connected between the sampling member 11 and the moving block 32, and is fixedly connected or movably connected to the mobile block 32. When the sampling member 11 is movable between a first working position and a second working position, the sampling member 11 drives the moving block 32 through the first linkage arm to move between a third working position and a fourth working position. Referring to FIG. 3, a container 221 and the cover 222 are placed at the material receiving position. The moving block 32 is provided at a side close to the storage cylinder 23, and at this time the moving block 32 is at the third working position to wait for the contact with the cover 222. When the moving block 32 moves from the third working position to the fourth working position, the moving block 32 can abut against the cover 222 of the container 221 in the material receiving position, and enable the cover body to rotate to close over the container 221. The moving block 32 moves to the side close to the sampling member 11, and at the same time, the moving block 32 is in the fourth working position. More specifically, in FIG. 3, the chute 311 is provided with a first end and a second end. The first end of the chute 311 is provided close to the storage cylinder 23, and the second end of the chute 311 is provided close to the sampling member 11. When the moving block 32 is at the first end of the chute 311, the moving block 32 is in the third working position, and when the moving block 32 is at the second end of the chute 311, the moving block 32 is in the fourth working position.

When the sampling member 11 switches from the second working position to the first working position, the designated container 221 is already loaded with the collected material sample, and the sampling member 11 pulls the moving block 32 towards the side close to the sampling member 11 through the first linkage arm, so that the moving block 32 pushes the cover 222 to rotate and close over the container 221, and the container 221 loaded with the material sample is discharged from the discharge port 34. When the sampling member 11 switches from the first working position to the second working position, the next designated container 221 is turned over by the stop plate 522 to the push plate 33, and is in the material receiving position, and the sampling member 11 drives the moving block 32 by the first linkage arm to move from the fourth working position to the third working position to wait for pushing the cover 222. Referring to FIG. 3, the bearing plate 31 is provided with a first side and a second side opposite to each other. The side of the bearing plate 31 for receiving the container 221 is defined as the first side. The chute 311 passes through the first side and the second side, and the moving block 32 is movably provided in the chute 311. The moving block 32 is provided with a third side facing towards the sampling member 11 and a fourth side facing towards the ground. The first linkage arm is connected to the fourth side of the moving block 32 to enable the first linkage arm to avoid the overturning path of the container 221, thereby avoiding the first linkage arm from interfering with the overturning of the next container 221 to the material receiving position when the first linkage arm pulls or pushes the moving block 32. When the sampling member 11 again switches from the second working position to the first working position, the moving block 32 repeats the above steps to push against the cover 222 again.

With the above reciprocal movement, the moving block 32 can cooperate with the movement of the sampling member 11 between the first working position and the second working position to move between the third working position and the fourth working position. The moving block 32 can quickly abut against the cover 222 and close the cover 222 with the container 221 after the loading of the container 221 has been completed. In this case, the moving block 32 is able to reset and wait for engagement with the next cover 222 before the next material sample collected by the sampling member 11 is discharged from the sample outlet 112. The discharge module 3 and the collection module 2 can work collaboratively to complete the loading-discharging operation quickly.

Specifically, the first linkage arm can be a rigid linkage.

Further, referring to FIG. 8, a cleaning mechanism 117 is also provided in the rod of the sampling member 11, and an air-outlet direction of the cleaning mechanism 117 faces toward the sample outlet 112 on the rod. In this case, when the sampling member 11 switches from the first working position to the second working position, the cleaning mechanism 117 can blow the material sample towards the sample outlet 112, avoiding the residue of the material sample in the single sampling operation, and facilitating the centralized discharge of samples obtained in a single sampling operation to the container 221 for storage.

More specifically, the rod is also provided with a plurality of air outlets. The plurality of air outlets are provided close to the sample outlet 112, and can be provided relative to the edge of the receiving port of the container 221 at the material receiving position. When the sampling member 11 is in the second working position, the air outlets are provided relative to the edge of the receiving port of the container 221 and avoid the interior of the receiving port, i.e., the area for receiving material sample in the container 221, thereby avoiding the material sample from being blown out of the container 221. The cleaning mechanism 117 can supply air from the air outlets, so that the air blows the receiving port of the container 221, which can avoid the material sample from falling on the receiving port and affecting the sealing between the cover 222 and the receiving port of the container 221.

The automatic sampling device provided in this embodiment can realize the sampling at multiple locations in a single operation by providing the push mechanism 51 and the container 221, and the container 221 loaded with material samples can be sealed by the sealing mechanism and then be placed at a designated discharge position by the discharge mechanism. In particular, when the automatic sampling device provided herein is used to sample material samples, such as sand and soil, the collected sand or soil can be loaded in the container 221, and then the loaded container 221 can be thrown into the sand or land. The sealed loaded container 221 can avoid the material sample from contacting with other material samples, thereby avoiding contamination of the collected material samples. When the number of sampling points 102 is large, the connecting member can also be used to connect the multiple containers 221 as a whole, and by pulling or picking up the connecting member, all of the containers 221 can be collected quickly, which saves working time and reduces workload.

Embodiment 3

Figure 12:
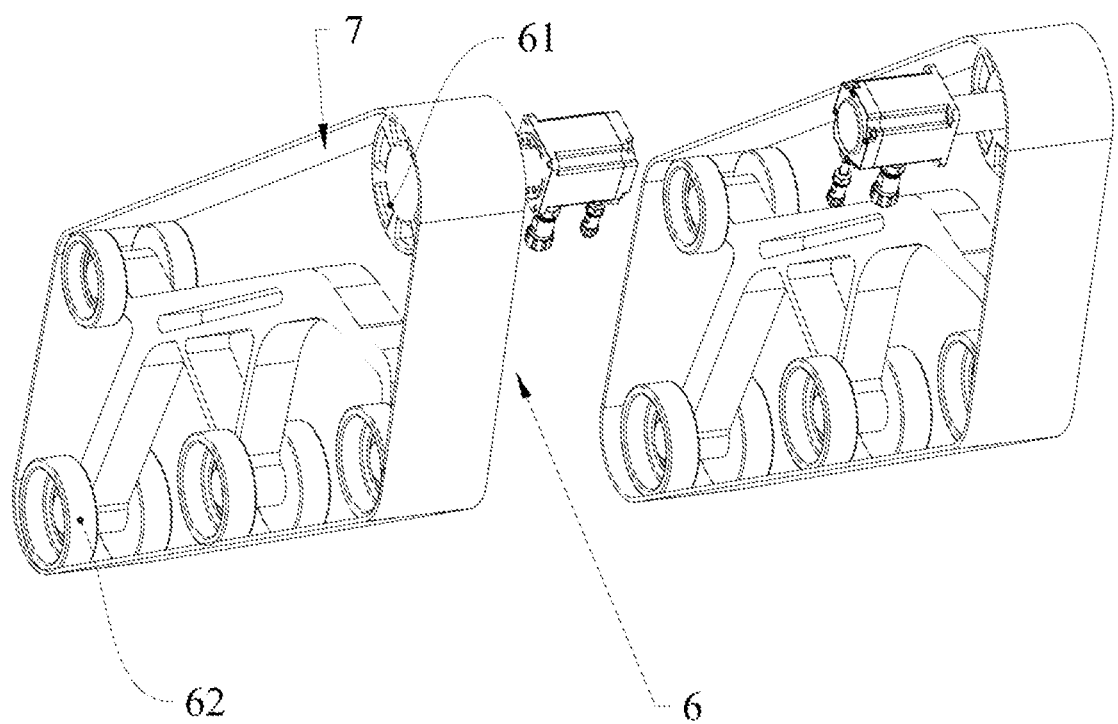
FIG. 12 is a schematic diagram of a structure of a wheel set and a traveling belt according to an embodiment of the present disclosure.

Referring to FIG. 12, an automatic sampling device is provided herein, the structure of which is similar to that of Embodiment 1 or 2, and the differences are described as follows. The traveling unit includes a wheel set 6 and a traveling belt 7. The traveling belt 7 is in a transmission connection with the wheel set 6, and the wheel set 6 is driven by a second drive mechanism to rotate, so that the traveling belt 7 connected to the wheel set 6 generates an interaction force with the ground to move the device. Specifically, the wheel set 6 may include an active wheel 61 and a plurality of driven wheels 62. The active wheel 61 and the plurality of driven wheels 62 are in a transmission connection with the traveling belt 7. The active wheel 61 can be in a transmission connection with the second drive mechanism through a transmission shaft, and can be driven by the second drive mechanism to rotate, thereby enabling the traveling belt 7 to rotate and be in rolling contact with the ground or other contact surfaces, so as to move the device forward. The axis of rotation of the active wheel 61 may be collinear with an axis of the transmission shaft or form an angle with the axis of the transmission shaft. It can be understood that the active wheel 61 is capable of oscillating or rotating. When the axis of rotation of the active wheel 61 is collinear with the axis of the transmission shaft, the traveling belt 7 is driven by the active wheel 61 to enable the traveling unit to travel along a straight line. When the axis of rotation of the active wheel 61 forms an angle with the axis of the transmission shaft, the traveling belt 7 is driven by the active wheel 61 to enable the traveling unit to travel along an arc to turn.

More specifically, the section of the traveling belt 7, which is in transmission connection with the active wheel 61 and the driven wheel 62, along a first direction is regular or irregular in shape. The regular shape is rectangle, parallelogram, trapezoid, oval or circle. The first direction is parallel to the travelling direction of the traveling belt 7. Preferably, the section of the traveling belt 7 along the first direction is a parallelogram, and the parallelogram has a set of acute angles opposite to each other and a set of obtuse angles opposite to each other. The side on which the sampling module 1 is located is defined as the forward direction of the automatic sampling device, and a first acute angle and a first obtuse angle are provided on the side close to the forward direction along the direction of gravity. Referring to FIGS. 1 and 12, the automatic sampling device can be applied for sampling on a region with high mobility, such as a sandy ground and a soil ground. When the automatic sampling device is travelling forward, the traveling belt 7 where the first obtuse angle is located comes into contact with the sandy ground, where two edges where the first obtuse angle is located can increase the contact area with the sandy ground, there avoiding the traveling belt 7 from being plunged into the sandy ground during the travelling.

More preferably, to avoid the traveling belt 7 from falling into the sand, the width of the traveling belt 7, i.e. the width of the traveling belt 7 expanded along the direction perpendicular to the traveling direction, is as large as possible. From the formula of P=F/S, when the force (F) is the fixed, the larger the area of the force (S) is, the smaller the pressure force (P) is. Therefore, the use of the wider traveling belt 7 can avoid the automatic sampling unit from falling into the sand.

In an embodiment, the traveling unit further includes a support assembly 8 having at least one degree of freedom. The support assembly 8 is connected to the power supply unit and/or the sampling unit, and at least part of the support assembly 8 can abut against the ground to reduce the contact pressure of the device with the contact surface. The support assembly 8 can be a robotic arm or other component, which can be used to assist the traveling of the automatic sampling unit. When the traveling unit is trapped into the sand, the support assembly 8 can support the automatic sampling device on the sand, reducing the contact pressure between the traveling unit and the sand, or, alternatively, enabling the traveling unit to leave from the sand to maintain its traveling state and ensure the normal operation of the automatic sampling device.

More specifically, the support assembly 8 may have a plurality of degrees of freedom to facilitate the adjustment of positions and angles.

Figure 13:
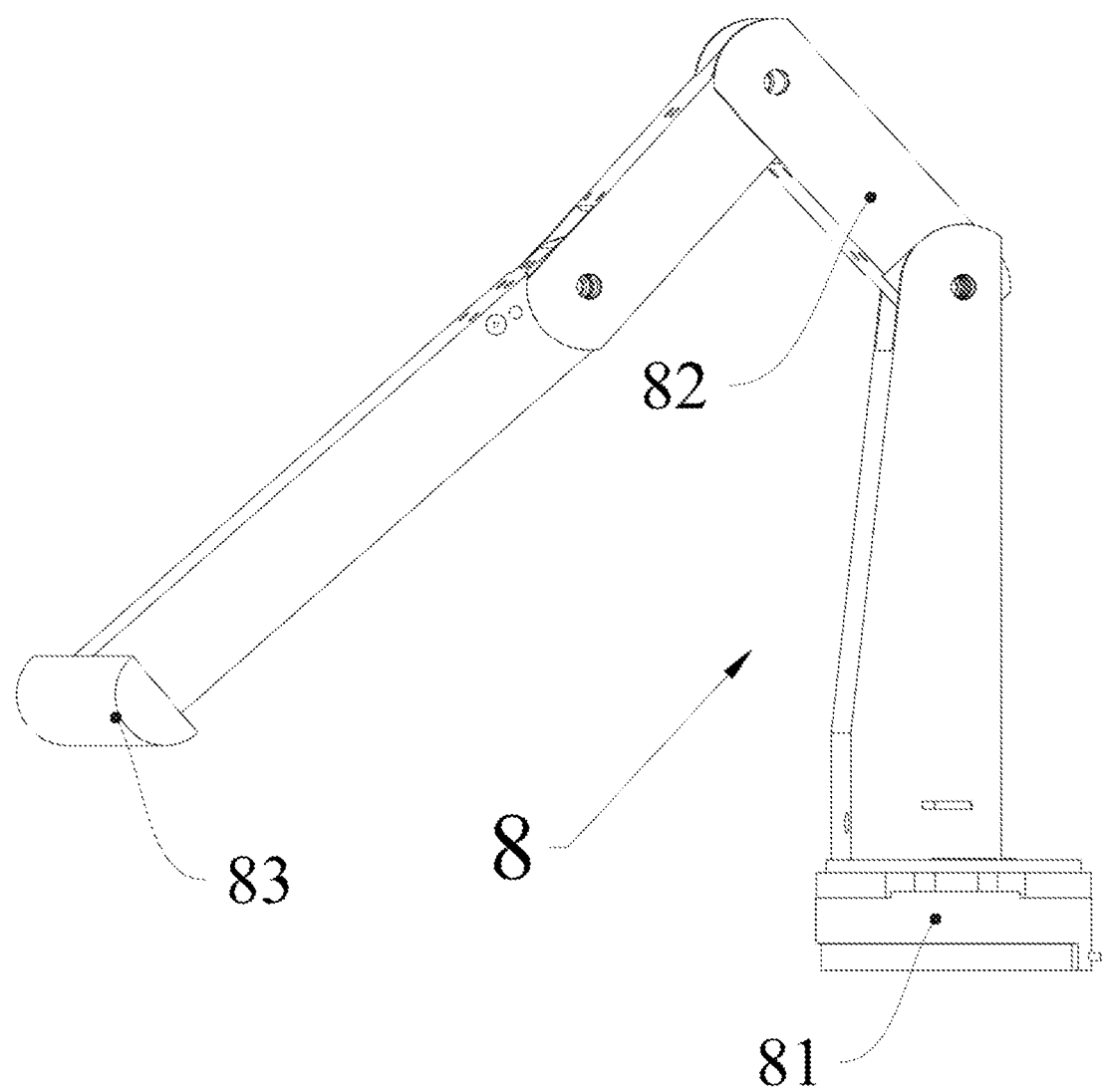
FIG. 13 is a schematic diagram of a structure of a support assembly according to an embodiment of the present disclosure.

In an embodiment, the support assembly 8 includes a sequentially connected support base 81, a connecting arm 82 and a support head 83. The support base 81 can be connected to the housing, and the number of the connecting arms 82 can be one or more. Referring to FIG. 13, the support assembly 8 includes a plurality of connecting arms 82, and the plurality of connecting arms 82 can be sequentially connected to form a connecting arm structure. One end of the connecting arm structure is movably connected to the support base 81, and the other end of the connecting arm structure is movably connected to the support head 83. Preferably, the support head 83 is provided with an arc-shaped baffle plate curved towards the side back from the ground. When the automatic sampling device is caught in the sand and cannot travel or travel slower, the support assembly 8 can be operated to move and make the support head 83 in contact with the sand. The curved baffle cane increases the contact area of the support head with the sand. From the formula of P=F/S, it can be seen that when the force (F) is the fixed, the larger the force area (S) is, the smaller the pressure (P) is, and thus the curved baffle plate is not easy to be caught in the sand. Therefore, the arc-shaped baffle plate can help the automatic sampling device to get out of the sand through the reaction force by the sand.

In this embodiment, the automatic sampling device can travel in a sampling region with soft texture and strong mobility by providing the wheel set 6, the traveling belt 7 and the support assembly 8, which can be adapted to a stringent field sampling environment, and can be detached from the sand for carrying out subsequent collection work.

Embodiment 4

Figure 14:
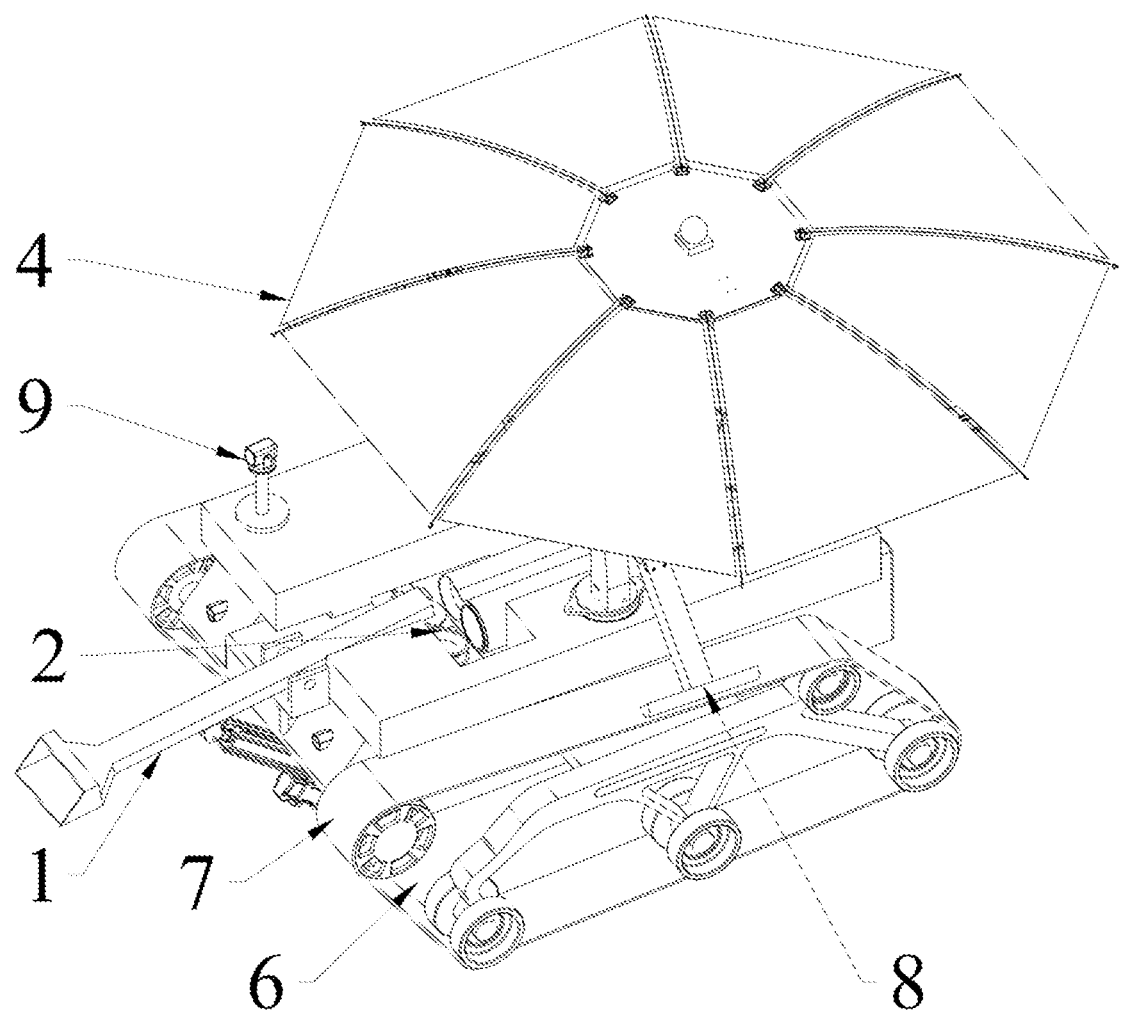
FIG. 14 is a schematic diagram of a structure of an automatic sampling device according to another embodiment of the present disclosure.
Figure 15:
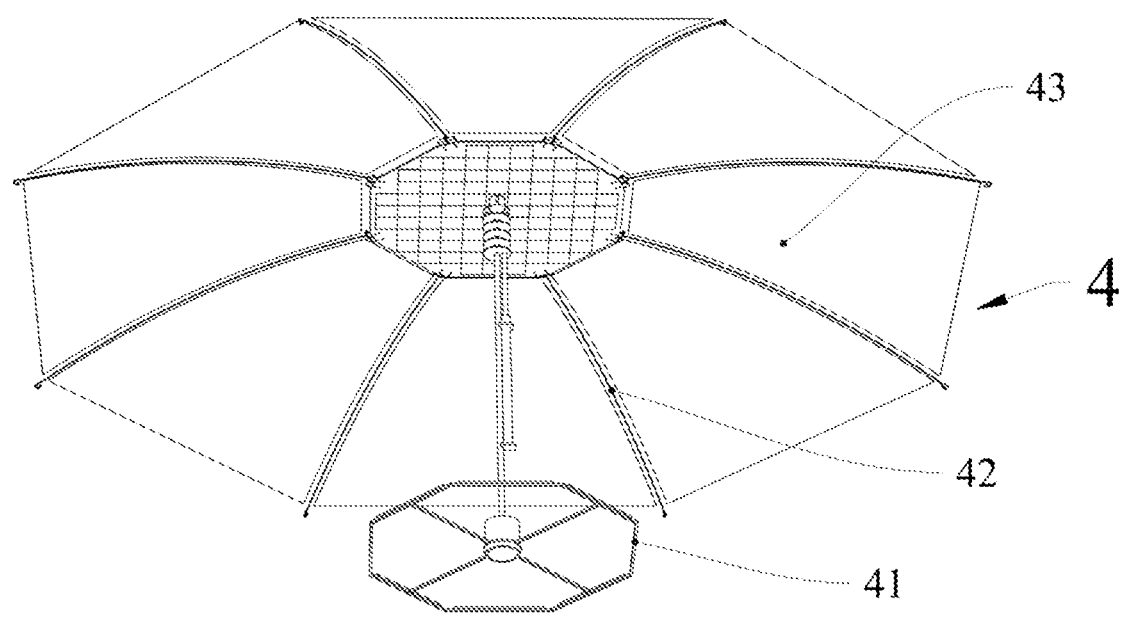
FIG. 15 is a schematic diagram of a structure of a solar power generation module according to an embodiment of the present disclosure.

Referring to FIGS. 14 and 15, an automatic sampling device is provided, the structure of which is basically similar to that of Embodiment 3, and the differences are stated below. The power supply unit further includes a first battery, and the first battery may be a storage battery, which can be connected to the sampling unit and the traveling unit, and provide electric power to the sampling unit and the traveling unit, so that the automatic sampling device is capable of traveling and sampling.

Preferably, the power supply unit includes a second battery and a power generation assembly. The power generation assembly is connected to the second battery and is configured to at least provide electrical energy to the second battery. The power generation assembly may be a new energy power generation module, specifically, may be a wind power generation module or a solar power generation module 4. Referring to FIG. 15, the solar power generation module 4 includes a mounting base 41, a bracket 42 and a solar cell 43. The mounting base 41 may be detachably connected to the housing. The bracket 42 is provided on the mounting base 41 and is at least configured for supporting the solar cell 43. The solar cell 43 is configured to receive and convert sun rays into electrical energy usable for the automatic sampling device. Specifically, the solar power generation module 4 includes a plurality of solar cells 43, and the plurality of solar cells 43 is unfold to receive sun rays or, alternatively, is fold. More specifically, the plurality of solar cells 43 may be connected using a retractable umbrella rib, and the solar cells 43 can be folded or unfolded by controlling the movement of the retractable umbrella rib.

In this embodiment, the automatic sampling device can provide a continuous power supply through the power generation assembly, and can be applied in a field sampling environment. When the power generation assembly is a solar power generation module 4, the power can be supplied to the device through the sun, so as to make up for the tense power issue in the field environment. In addition, the solar power module can also be switched between unfolding and folding, so that the solar cell can be unfolded to collect light energy according to the actual use requirements, or folded to reduce the traveling resistance of the device.

Embodiment 5

Figure 16:
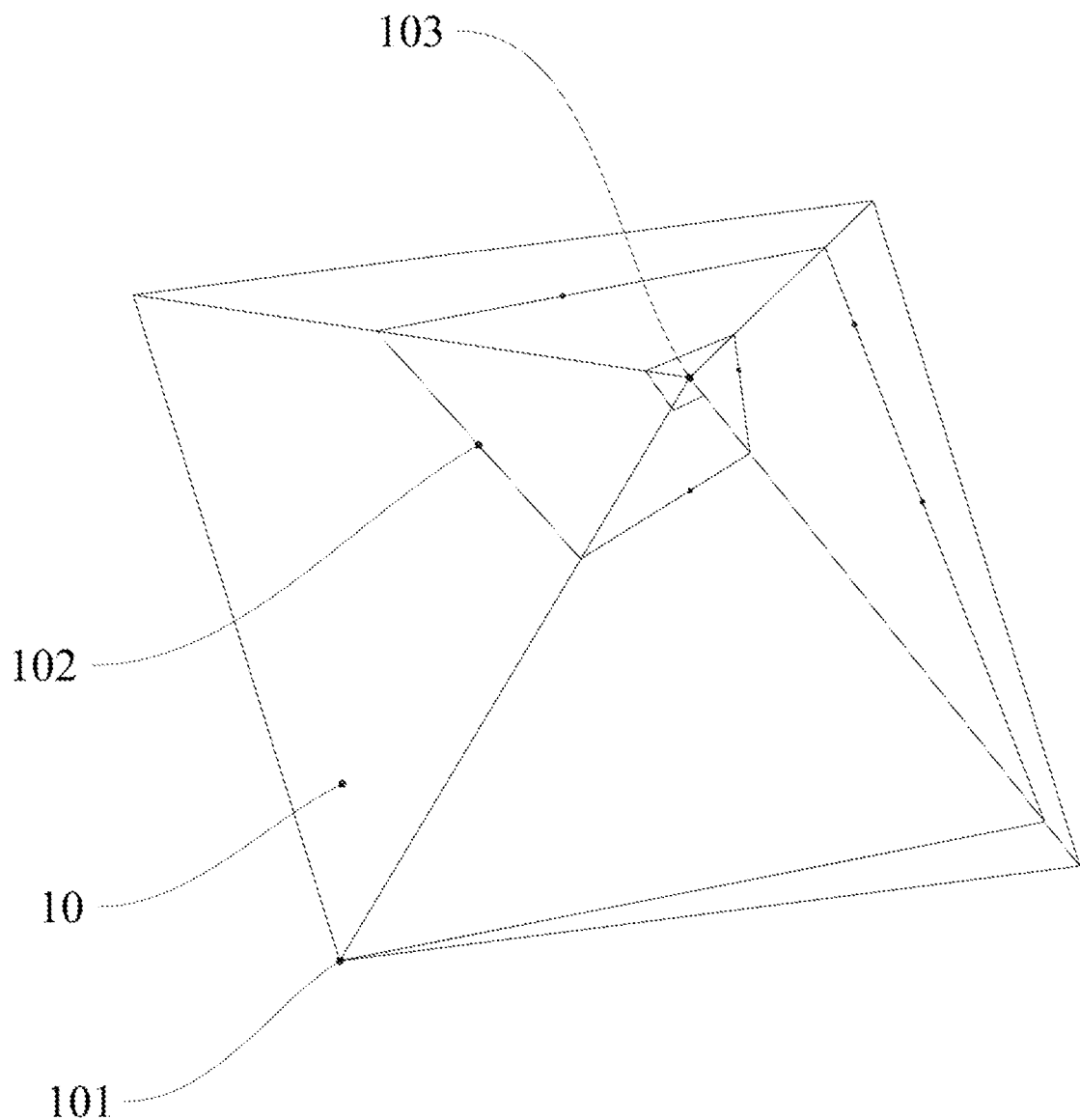
FIG. 16 schematically shows a sampling path of the automatic sampling device according to an embodiment of the present disclosure on a sand hill.

Referring to FIGS. 1-15, an automatic sampling device is provided in this embodiment, the structure of which is basically similar to that of Embodiment 4, and the differences are described as follows. The automatic sampling device further includes a record carrier 9 for capturing pictures and a position system. The record carrier 9 can capture pictures on the traveling path of the automatic sampling device. The record carrier 9 can be a camera or a photographic camera, which can record pictures of a to-be-sampled region taken by the automatic sampling device. The position system can record the traveling path of the automatic sampling device, and is connected to the record carrier 9. The picture recorded by the record carrier 9 matches the path recorded by the position system and can generate a three-dimensional (3D) or two-dimensional (2D) model of the to-be-sampled region by using a measuring system. The position system can be a global position system (GPS). Specifically, the to-be-sampled region is a sand hill 10, and a 3D model of the sand hill 10 can be generated and a sampling path of the sand hill 10 can be planned by the measurement system. As shown in FIG. 16, the sampling path of the sand hill 10 is in a spiraling upward trend, and has a starting point 101 and an ending point 103. The sampling point 102 can be selected on the sampling path according to the sampling slope and the sampling height. The starting point 101 is defined, and the automatic sampling device is placed at the starting point 101. The automatic sampling device can be controlled by a control system to carry out one-by-one sampling along the planned sampling path, making the sampling more convenient and eliminating a large amount of manual labor.

Specifically, a sampling method by using the automatic sampling device includes the following steps.
- (S1) The automatic sampling device is placed in a designated to-be-sampled region.
- (S2) The automatic sampling device is operated to move a sampling region.
- (S3) The sampling member 11 collects material samples from the sampling region and discharges or transports the material samples into a container 221 placed at a sample outlet 112 of the sampling member 11.
- (S4) The discharge module 3 places the container 221 loaded with the material samples at a designated discharging position.
- (S5) The automatic sampling device is operated to move to the next sampling region, and the above steps are repeated.

More specifically, the step (S1) further includes the following steps. A 3D or 2D model of the sampling region is generated, and a specified sampling path is planned. A starting point 101, a sampling point 102, and an end point 103 on the sampling path are defined. The automatic sampling device is controlled to travel along the sampling path.

In this embodiment, the sampling work can be carried out more conveniently by using the automatic sampling device. After generating a model of the to-be-sampled region by the measurement system, a specified sampling path is planned, and a starting point 101, a sampling point 102 and an end point 103 on the sampling path are defined. In this case, the automatic sampling device is triggered to arrive at the specified sampling point 102 from the starting point 101 to carry out the sampling operation. After dropping the container 221, the automatic sampling device travels to the next sampling point 102 for sampling, which reduces the workload of the operator and accelerates the sampling work.

It should be understood that the above embodiments are merely to illustrate the technical concepts and features of the present disclosure, which are intended to enable one of ordinary skill in the art to understand the content of the present disclosure and to implement the present disclosure accordingly, and are not intended to limit the scope of protection of the present disclosure. Any equivalent changes or modifications made in accordance with the spirit of the present disclosure shall be included by the scope of protection of the present disclosure.

What is claimed is:

1. An automatic sampling device, comprising:
   a sampling unit;
   a traveling unit; and
   a power supply unit;
   wherein the sampling unit comprises a sampling module, a collection module, a push module and a discharge module; the sampling module is configured to be in contact with and collect a material sample; the sampling module comprises a sampling member which is movable; and the sampling member is configured to be driven by a first drive mechanism to move between a first working position and a second working position; a sample inlet of the sampling member is configured to be in contact with and collect the material sample when the sampling member is at the first working position, and a sample outlet of the sampling member is configured to discharge the material sample when the sampling member is at the second working position; the collection module comprises a plurality of containers, a plurality of covers and a storage cylinder; each of the plurality of containers and one of the plurality of covers corresponding thereto are in an integrated or split structure; the storage cylinder is provided with a storage chamber running through the storage cylinder; the storage chamber is configured to accommodate the plurality of containers; a first end of the storage chamber is provided with a material receiving position; the material receiving position is at least configured to receive the plurality of containers; a second end of the storage chamber is provided with the push module; the plurality of containers and the plurality of covers are sequentially arranged on a motion path of the push module; the push module is at least configured to push a designated container among the plurality of containers and a cover thereof to the material receiving position, so as to enable a receiving port of the designated container to correspond to the sample outlet of the sampling module to receive the material sample collected by the sampling module; the collection module comprises a sealing mechanism; the sealing mechanism is configured to be in contact with the cover of the designated container to put the cover on the receiving port of the designated container for sealing the receiving port; and the discharge module is configured to place the designated container at a designated discharge position;
   the traveling unit is connected to the sampling unit, and is configured to move the sampling unit to a specified sampling area;
   the power supply unit is connected to the sampling unit and the traveling unit, and is at least configured to provide power to the sampling unit and the traveling unit;
   the push module comprises a push mechanism and a turning mechanism; the plurality of containers and the plurality of covers are configured to be constrained between the turning mechanism and the push mechanism; the push mechanism is configured to push the plurality of containers and the plurality of covers to abut against the turning mechanism; and the turning mechanism is configured to turn the plurality of containers and the plurality of covers to the material receiving position in sequence and to enable a receiving port of each of the plurality of containers to face towards the sample outlet of the sampling module; and
   the turning mechanism comprises a stop plate, and the stop plate is provided with a receiving groove; the stop plate is configured to move between a receiving position and a turning position; the receiving groove is configured to be at least partially in contact with the designated container when the stop plate is at the receiving position; and when the stop plate is at the turning position, the receiving groove is configured to allow the designated container therein to slide to the material receiving position, and a next designated container is configured to abut against the stop plate.

2. The automatic sampling device of claim 1, wherein the collection module further comprises a connecting member provided between adjacent two containers; or
   the collection module further comprises a plurality of connecting members, and the plurality of connecting members and the plurality of containers are alternately arranged.

3. The automatic sampling device of claim 1, wherein the stop plate is provided with a bevel towards a sliding direction of the designated container.

4. The automatic sampling device of claim 3, wherein the bevel is flat or curved.

5. The automatic sampling device of claim 3, wherein the turning mechanism further comprises a ball; the ball is configured to roll or slide on a surface where the bevel is located; and when the stop plate is at the turning position, the ball is configured to be at least partially in contact with the designated container, and the ball is configured to roll and/or slide along the sliding direction of the designated container.

6. The automatic sampling device of claim 1, wherein the traveling unit comprises a wheel set and a traveling belt, and the traveling belt is in transmission connection with the wheel set; and the wheel set is configured to be driven by a second drive mechanism to rotate to allow generation of an interaction force between the traveling belt and ground to move the automatic sampling device.

7. The automatic sampling device of claim 6, wherein the wheel set comprises at least one active wheel and a plurality of driven wheels; the at least one active wheel and the plurality of driven wheels are all in transmission connection with the travelling belt; the at least one active wheel is in transmission connection with the second drive mechanism via a transmission shaft; and a rotation axis of the at least one active wheel is collinear with an axis of the transmission shaft or forms an angle with the axis of the transmission shaft.

8. The automatic sampling device of claim 7, wherein a section of the traveling belt along a direction parallel to a traveling direction of the traveling belt has a regular shape or an irregular shape; and the regular shape is rectangle, parallelogram, trapezoid, ellipse or circle.

9. The automatic sampling device of claim 1, wherein the power supply unit comprises a first battery; and the first battery is connected to the sampling unit and the traveling unit.

10. The automatic sampling device of claim 1, wherein the power supply unit comprises a battery and a power generation assembly; and the power generation assembly is connected to the battery, and is at least configured to supply electricity to the battery.

11. The automatic sampling device of claim 9, wherein the power supply unit comprises a second battery and a power generation assembly; and the power generation assembly is connected to the second battery, and is at least configured to supply electricity to the second battery.

12. The automatic sampling device of claim 1, further comprising:
- a record carrier; and
- a positioning system;
- wherein the record carrier is configured to capture images of a to-be-detected area in a traveling path of the automatic sampling device; the positioning system is configured to record the traveling path of the automatic sampling device; and the positioning system is connected to the record carrier, and is configured to generate a model of the to-be-detected area by using a measuring system.

* * * * *